United States Patent
Reiko

Patent Number: 5,973,769
Date of Patent: Oct. 26, 1999

[54] BOOK-COPYING SHADOW BLOCK

[76] Inventor: Asai Reiko, 2-5-32 Tama-Machi, Fuchu-Shi, Tokyo, Japan, 183-0002

[21] Appl. No.: 09/031,147

[22] Filed: Feb. 26, 1998

[51] Int. Cl.⁶ .................................................. G03B 27/52
[52] U.S. Cl. ............................................................ 355/82
[58] Field of Search ................................ 355/25, 75, 125, 355/126, 82; 399/362

[56] References Cited

U.S. PATENT DOCUMENTS 3,630,612  12/1971  Lehovac ..................................... 355/82
3,635,557  1/1972  Alderton ..................................... 355/65
5,084,732  1/1992  Tsaur et al. ................................ 355/75

*Primary Examiner*—D. Rutledge
*Attorney, Agent, or Firm*—Frank C. Prince

[57] ABSTRACT

An unfolded book, placed upon a copy machine, can have its two exposed pages reproduced without a shadow between the two pages using this invention. A bar formed in the shape of a "T" is placed, with the "T" upside down, and with the shaft of the "T" resting along the crease of the book between the two pages. Slidable stop plates at each end of the bar can be used to snuggle the book with the bar. Variations in the shape of the arms of the "T" and in the shape of the terminations of the arms are presented.

5 Claims, 2 Drawing Sheets

BOOK-COPYING SHADOW BLOCK

BACKGROUND OF THE INVENTION

The present invention is an accessory for a copy machine. When a bound volume, such as a book is copied, splayed open upon the copy machine to expose the print, the center area at the binding creates a shadow on the copy. A decisive manner of obviating such defect has not been offered before. The present invention does solve the problem.

SUMMARY OF THE INVENTION

The present invention is a plastic extrusion having a cross section like an upside down "T." The top of the "T" (actually the bottom in this case), at the two ends of the top the end shape is an acute angle. The extrusion also has stop plates which are used to grip the block at its top and bottom, holding the shadow block in place. The extrusion is white or light colored. The copying light reflects from the block to eliminate the shadow which otherwise appears in the center of a printed copy of the two book pages which have been splayed upon the copier for copying.

DETAILED DESCRIPTION OF THE INVENTION

Figure 1:
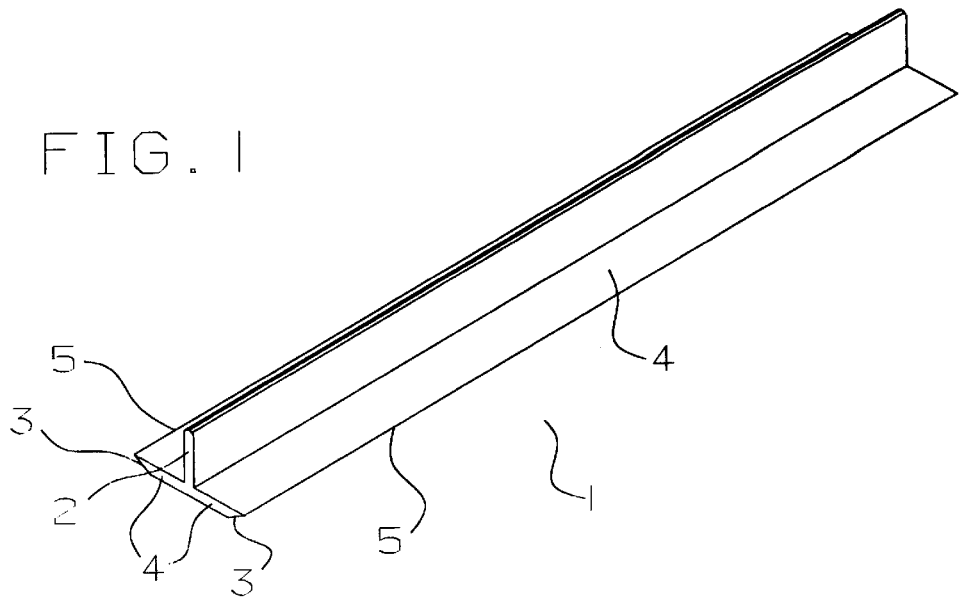
FIG. 1 is a perspective view of the shadow block.

In FIG. 1 can be seen the shadow block 1 lying as an inverted "T" having a vertical portion or shaft 2 and a horizontal portion comprising arms 4. The vertical portion of the "T" 2 is inserted in the crevice between the pages of a splayed open book, shown in phantom, as seen in FIG. 2.

The shape of the block suggests that it be made of a plastic extrusion. However, how the invention is formed is not part of the disclosure. It could be made of cast or extruded metal with a bare or a painted surface. By making the block from soft plastic, rubber or stiff paper the adhering of the base edges to the pages is not only enhanced, any creation of scratches to the copy machine glass is obviated.

By data gathered from experiments with one example model of the invention it is indicated that the cross section of the block can be 10 mm in height, 20 mm in width and 300 mm length, although the concept of the invention is not limited to these dimensions. The preferred color is white, although a light color close to white can produce good results.

Figure 2:
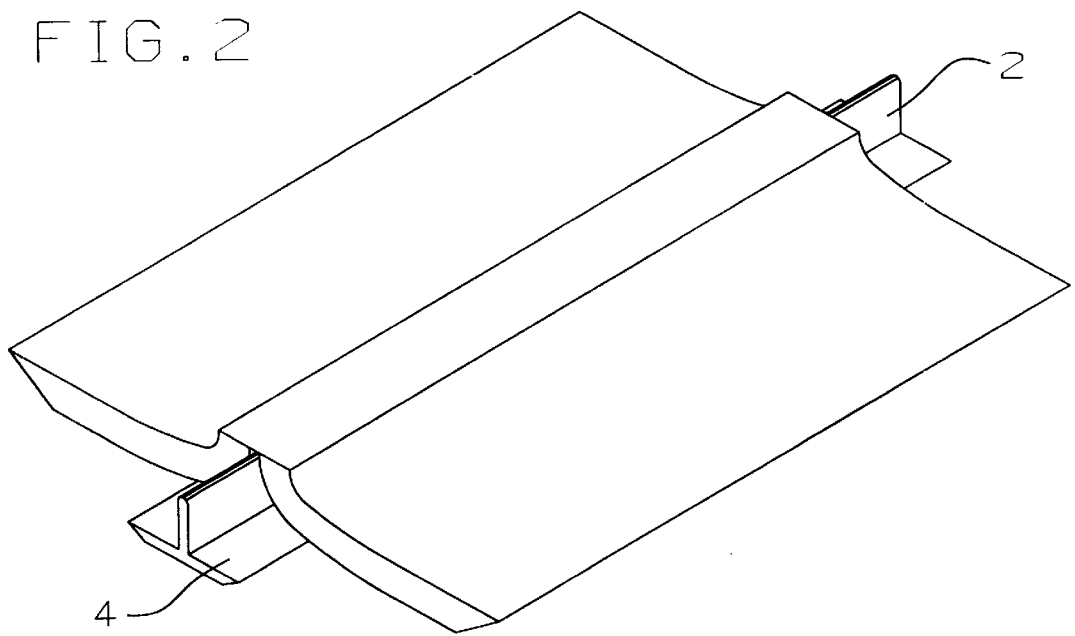
FIG. 2 shows the invention during use.

The block is used by first placing it under the opened book as the book is placed on the copy machine as shown in FIG. 2. There is no need to press the book down on the glass surface of the copy machine. Thus, the book structure is not deteriorated by excessive strain.

Figure 3:
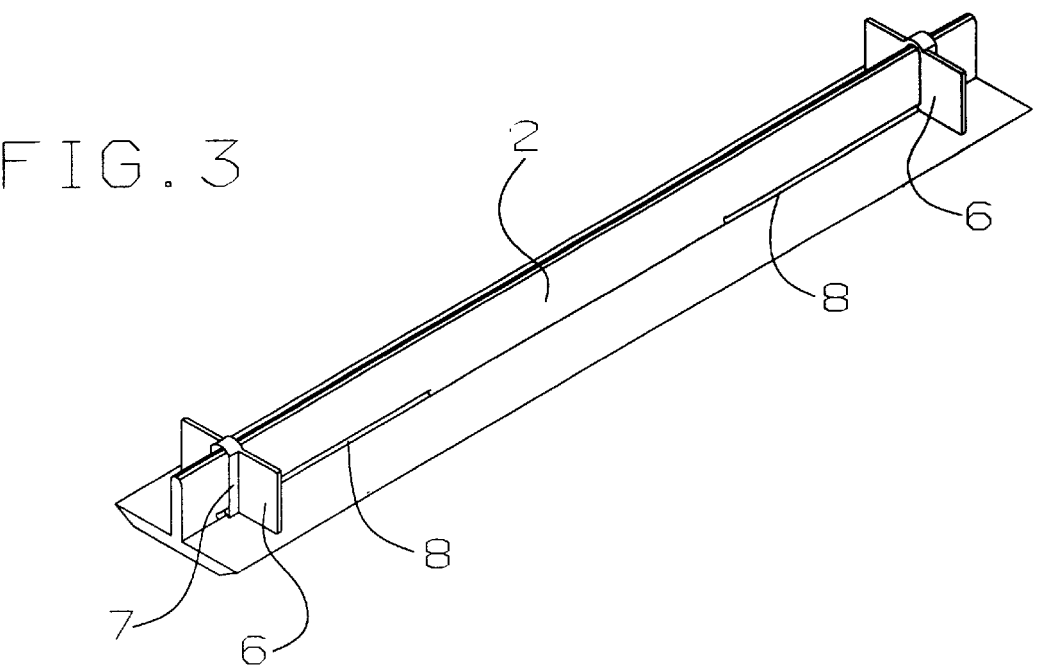
FIG. 3 is a perspective view of the invention with stop plates in place.

Another form of the invention can be seen in FIG. 3 showing stop plates 6 held to the "T" shaft 2 by clips 7 with the clips sliding in slots 8. Thus, the stop plates 6 can each be moved to snuggle against the book to hold the block in place. Such a concept of clips can be configured without the slots.

Figure 4:
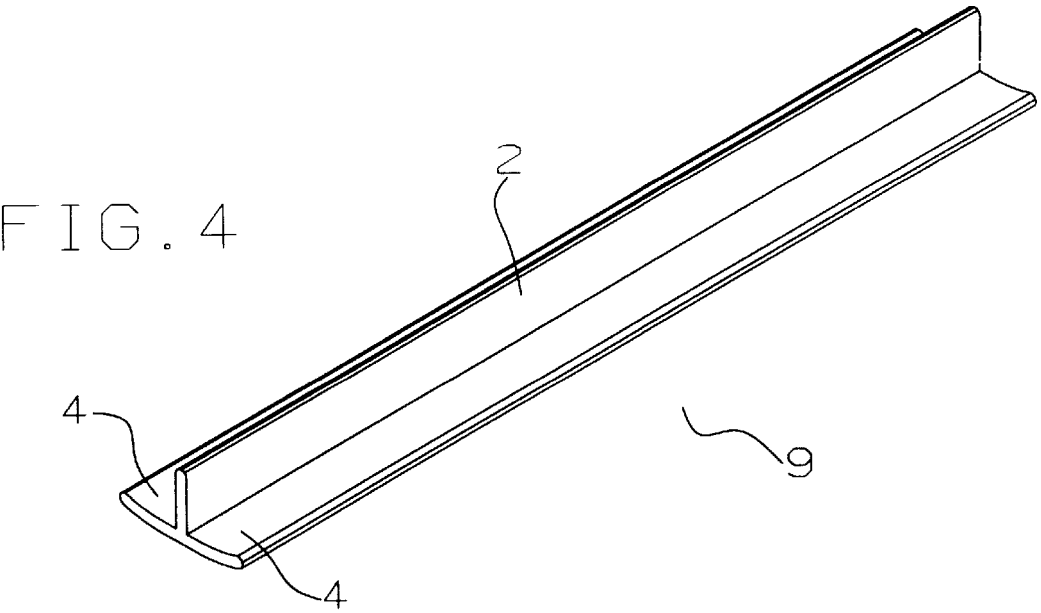
FIG. 4 is a perspective view of the shadow block wherein its reflective cross for the "T" shape is arc shaped.

FIG. 4 shows a variation 9 of the shadow block with two differences from shadow block 1: the arms 4 have an arc shape and the edges of the arms are tapered from both edges. It is not necessary to have the indicated acute angle edges 3 of shadow block 1.

The number and location of the stop plates 6 depends upon how the book is located on the copy machine. For example, only one stop plate might be used.

I claim:

1. An insert for a bound volume of pages opened and located for being copied on a copy machine, said bound volume opened with two exposed pages facing downward onto said machine, said two pages coming together and forming a fold line at the binding of said bound volume, comprising:

A length of bar, said bar having a cross section shaped like the letter "T," said "T" shape being made up of a vertical shaft and arms, the said vertical shaft of said "T" being placed into said fold line, said exposed pages resting, one each, on said arms, the result being copies produced without a shadow at said fold line.

2. The insert of claim 1 in which said insert is of excess length compared to the length of said fold line of said open bound volume, and including two stop plates, located, one at each end of said vertical shaft portion of said bar, said stop plates functioning to hold said insert to said bound volume.

3. The insert of claim 1 in which said insert is of excess length compared to the length of said fold line, including a stop plate located at one end of said insert, said stop plate resting against one edge of said bound volume with said insert in place within said fold line.

4. The insert of claim 1 in which said arms form a convex arc.

5. The insert of claim 1 in which said arms have a thickness with an interrupted "top" surface and an under surface interrupted by said vertical shaft, said arms each terminating at the extremities of said "T" in an acute angle, the apex of said acute angle coinciding with said under surface of said arms.

* * * * *